United States Patent
Inoue et al.

(10) Patent No.: US 12,374,682 B2
(45) Date of Patent: Jul. 29, 2025

(54) ACTIVE MATERIAL AND PROCESS FOR PRODUCING THE SAME

(71) Applicant: Mitsui Mining & Smelting Co., Ltd., Tokyo (JP)

(72) Inventors: Daisuke Inoue, Ageo (JP); Takuya Yamamoto, Ageo (JP); Jaime W. Dumont, Lyons, CO (US); Arrelaine A. Dameron, Boulder, CO (US); Barbara K. Hughes, Wheat Ridge, CO (US)

(73) Assignee: MITSUI MINING & SMELTING CO., LTD. (JP)

( * ) Notice: Subject to any disclaimer, the term of this patent is extended or adjusted under 35 U.S.C. 154(b) by 72 days.

(21) Appl. No.: 17/344,011

(22) Filed: Jun. 10, 2021

(65) Prior Publication Data

US 2022/0399537 A1 Dec. 15, 2022

(51) Int. Cl.
| | |
|---|---|
| H01M 4/38 | (2006.01) |
| H01M 4/02 | (2006.01) |
| H01M 4/04 | (2006.01) |
| H01M 4/36 | (2006.01) |
| H01M 4/505 | (2010.01) |
| H01M 10/0525 | (2010.01) |
| H01M 10/0562 | (2010.01) |

(52) U.S. Cl.
CPC ......... H01M 4/366 (2013.01); H01M 4/0407 (2013.01); H01M 4/0428 (2013.01); H01M 4/382 (2013.01); H01M 4/505 (2013.01); H01M 10/0562 (2013.01); *H01M 2004/021* (2013.01); *H01M 2004/028* (2013.01); *H01M 10/0525* (2013.01)

(58) Field of Classification Search
CPC .. H01M 4/366; H01M 4/0407; H01M 4/0428; H01M 4/382; H01M 4/505; H01M 2004/021; H01M 2004/028; H01M 4/48; H01M 4/483
See application file for complete search history.

(56) References Cited

U.S. PATENT DOCUMENTS

| | | | |
|---|---|---|---|
| 8,535,832 B2 * | 9/2013 | Karthikeyan | H01M 4/505 429/231.1 |
| 2009/0081554 A1 | 3/2009 | Takada et al. | |
| 2015/0024280 A1 * | 1/2015 | Uchiyama | H01M 10/052 429/231.5 |
| 2016/0111716 A1 | 4/2016 | Kagei et al. | |
| 2016/0351943 A1 | 12/2016 | Albano et al. | |
| 2016/0351973 A1 | 12/2016 | Albano et al. | |
| 2016/0372748 A1 * | 12/2016 | Nakayama | H01M 4/485 |
| 2019/0341601 A1 | 11/2019 | Park et al. | |
| 2020/0083524 A1 | 3/2020 | Baek et al. | |
| 2020/0119341 A1 | 4/2020 | Baek et al. | |
| 2020/0343536 A1 | 10/2020 | Suh et al. | |

FOREIGN PATENT DOCUMENTS

| | | |
|---|---|---|
| CN | 106865496 A | 6/2017 |
| JP | 2005-310744 A | 11/2005 |
| JP | 4982866 B2 | 7/2012 |
| JP | 2015140297 A * | 8/2015 |
| JP | 2018-125214 A | 8/2018 |
| JP | 2018-190720 A | 11/2018 |
| JP | 2020-135948 A | 8/2020 |
| KR | 10-2019-0051862 A | 5/2019 |
| WO | WO-2014-185547 A1 | 11/2014 |

OTHER PUBLICATIONS

Youzhong Dong, Electrochemical performance and lithium-ion insertion/extraction mechanism studies of the novel Li2ZrO3 anode materials, Feb. 13, 2015, Electrochimica Acta, vol. 161, pp. 219-220. https://doi.org/10.1016/j.electacta.2015.01.220 (Year: 2015).*
Gang Li, One-time sintering process to synthesize ZrO2- coated LiMn2O4 materials for lithium-ion batteries, May 8, 2018, RSC Advances, vol. 8, p. 16753. https://doi.org/10.1039/C8RA01421C (Year: 2018).*
Google Machine Translation of JP 2015140297 originally published to Okamoto Rryosuke on Aug. 2, 2015 (Year: 2015).*
H. Zhang et al., "Surface-Coated $LiNi_{0.8}CO_{0.1}Mn_{0.1}O2$ (NCM811) Cathode Materials By $Al_2O_3$, $ZrO_2$, and $Li_2O-2B_2O_3$ Thin-Layers for Improving the Performance of Lithium Ion Batteries", Frontiers in Materials, vol. 6, Article 309, Nov. 2019, pp. 1-10.
Jianneng Liang et al., "Stabilizing and understanding the interface between nickel-rich cathode and PEO-based electrolyte by lithium niobium oxide coating for high-performance all-solid-state batteries"; Nano Energy; ISSN:2211-2855, DOI: 10.1016/j.nanoen.2020.105107; vol. 78; Dec. 1, 2020; pp. 1-11 (total 11 pages).
Binghong Han et al., "Influence of Coating Protocols on Alumina-Coated Cathode Material: Atomic Layer Deposition versus Wet-Chemical Coating"; Journal of the Electrochemical Society; DOI: 10.1149/2.0681915jes URL:https://iopscience.iop.org/article/10.1149/2.0681915jes/pdf [retrieved on Sep. 25, 2023]; pp. A3679-A3684; Jan. 1, 2019 (total 7 pages).
Kazunori Takada et. al., Chapter 3—Development of all solid-state secondary batteries, No. 4. Higher output of all-solid-state lithium rechargeable batteries; Published on Jun. 29, 2007; pp. 198-210 (total 10 pages).

(Continued)

Primary Examiner — Brittany L Raymond
(74) Attorney, Agent, or Firm — Harness, Dickey & Pierce, P.L.C.

(57) ABSTRACT

An active material includes a core portion, and a coating portion arranged on a surface of the core portion. The core portion contains elemental lithium (Li), elemental manganese (Mn), and elemental oxygen (O). The coating portion contains an element A (A is at least one selected from the group consisting of Ti, Zr, Ta, Nb, and Al) and elemental oxygen (O). W/(T×S) is more than 0 and 15% by mass/(cm³/g) or less, wherein T (nm) represents an average thickness of the coating portion, S (m²/g) represents a specific surface area of the active material, and W (% by mass) represents an amount of element A contained in the coating portion.

13 Claims, No Drawings

(56) References Cited

OTHER PUBLICATIONS

Kazunori Takada et. al., "Interfacial modification for high-power solid-state lithium batteries"; Solid State Ionics 179; Year 2008; pp. 1333-1337 (total 5 pages).

Kazuya Okada et. al., "Preparation and electrochemical properties of $LiAlO_2$-coated $Li(Ni_{1/3}Mn_{1/3}Co_{1/3})O_2$ for all-solid-state batteries"; Solid State Ionics 255; Year 2014; pp. 120-127 (total 8 pages).

* cited by examiner

ACTIVE MATERIAL AND PROCESS FOR PRODUCING THE SAME

BACKGROUND

Technical Field

The present invention relates to an active material and a process for producing the same.

Related Art

Batteries containing a positive electrode, a negative electrode, and an electrolyte have a large energy density, and can be easily made smaller and lighter, and thus they are widely used as a power source of portable electronic devices such as laptop computers and mobile phones, and the like.

Known examples of an active material contained in positive electrodes of such batteries include lithium-metal complex oxides such as $LiCoO_2$, $LiNiO_2$, and $LiMnO_2$ having a layered crystal structure, and lithium-manganese oxides ($LiMn_2O_4$, $LiNi_{0.5}Mn_{1.5}O_4$) having a spinel structure.

Recently, in order to improve the battery performance, techniques for forming a coating portion on the active material have been proposed (see JP 2005-310744A, WO 2014/185547A1, and "Surface-Coated $LiNi_{0.8}Co_{0.1}Mn_{0.1}O_2$ (NCM811) Cathode Materials by $Al_2O_3$, $ZrO_2$, and $Li_2O$-$2B_2O_3$ Thin-Layers for Improving the Performance of Lithium Ion Batteries" ORIGINAL RESEARCH published: 29 Nov. 2019 doi: 10.3389/fmats.2019.00309, for example).

As described in JP 2005-310744A, WO 2014/185547A1 and "Surface-Coated $LiNi_{0.8}Co_{0.1}Mn_{0.1}O_2$ (NCM811) Cathode Materials by $Al_2O_3$, $ZrO_2$, and $Li_2O$-$2B_2O_3$ Thin-Layers for Improving the Performance of Lithium Ion Batteries", studies regarding active materials having a coating portion have been intensively performed. Meanwhile, there is a demand for a further improvement in the performance of active materials having a coating portion.

Accordingly, it is an object of the present invention to provide an active material capable of realizing excellent battery performance and a process for producing the same.

SUMMARY

The present invention provides an active material comprising: a core portion; and a coating portion arranged on a surface of the core portion,
wherein the core portion contains elemental lithium (Li), elemental manganese (Mn), and elemental oxygen (O),
the coating portion contains an element A (A is at least one selected from the group consisting of Ti, Zr, Ta, Nb, and Al) and elemental oxygen (O), and
W/(S×T) is more than 0 and 15% by mass/($cm^3$/g) or less,
wherein T (nm) represents an average thickness of the coating portion, S ($m^2$/g) represents a specific surface area of the active material, and W (% by mass) represents an amount of element A contained in the coating portion.

Furthermore, the present invention provides an active material comprising: a core portion; and a coating portion arranged on a surface of the core portion,
wherein the core portion contains elemental lithium (Li), elemental manganese (Mn), and elemental oxygen (O),
the coating portion contains an element A (A is at least one selected from the group consisting of Ti, Zr, Ta, Nb, and Al) and elemental oxygen (O), and
a half width of a peak of the element A in a spectrum is 25 nm or less, the spectrum being obtained through line analysis from a surface to an internal portion of the active material using a STEM method at a cross-section of the active material.

Furthermore, the present invention provides a preferred process for producing the above-described active material, including:
forming a coating portion containing an element A (A is at least one selected from the group consisting of Ti, Zr, Ta, Nb, and Al) and elemental oxygen (O) through atomic layer deposition on the surface of the core portion containing elemental lithium (Li), elemental manganese (Mn), and elemental oxygen (O).

DETAILED DESCRIPTION

Hereinafter, the present invention will be described by way of a preferred embodiment thereof. The active material of the present invention includes a core portion and a coating portion. The coating portion is arranged on the surface of the core portion. Hereinafter, each of the core portion and the coating portion will be described.

Core Portion

The core portion accounts for a large portion of the active material, and serves as a base material of the active material.

The core portion may contain, for example, a lithium-metal complex oxide. Examples of the lithium-metal complex oxide that may be used include known lithium-metal complex oxides. For example, the lithium-metal complex oxide may be one, or a combination of two or more, of a lithium-containing complex oxide having a layered rock salt-type structure and being represented by the general formula $LiMO_2$ (M is an elemental metal), a lithium-containing complex oxide having a spinel-type structure and being represented by the general formula $LiM_2O_4$, and a lithium-containing complex oxide having an olivine structure and being represented by the general formula $LiMPO_4$ (M is an elemental metal) or $LiMSiO_4$ (M is an elemental metal). However, the lithium-metal complex oxide is not limited to these oxides.

It is preferable that the core portion contains a spinel-type complex oxide containing elemental lithium (Li), elemental manganese (Mn), and elemental oxygen (0) (hereinafter, this core portion will also be referred to as a "core portion A"). In the case where the active material of the present invention containing the core portion A is used as a positive electrode active material, the positive electrode active material has a working potential of 4.5 V or more, with the potential of metal Li as a reference potential. The wording "having a working potential of 4.5 V or more, with the potential of metal Li as a reference potential" does not necessarily mean "having only a working potential of 4.5 V or more as a plateau region", but also encompasses "partially having a working potential of 4.5 V or more". Accordingly, the active material of the present invention is not limited to a positive electrode active material composed entirely of a 5 V class positive electrode active material that has a working potential of 4.5 V or more as a plateau region. For example, the active material of the present invention may also contain a positive electrode active material that has a working potential of less than 4.5 V as a plateau region. Specifically, the above-mentioned 5 V class positive electrode active material preferably accounts for at least 30 mass %, more preferably at least 50 mass %, and even more preferably at least 80 mass % (including 100 mass %), of the active material of the present invention.

Other elements contained in the core portion A in addition to elemental lithium (Li), elemental manganese (Mn), and elemental oxygen (O) may be composed of one element or two or more elements. If the other elements are composed of two or more elements, at least one element is preferably one selected from the group consisting of Ni, Co, and Fe (hereinafter, referred to as an "element $M^1$"). The element $M^1$ is a substituent element that mainly contributes to realization of a working potential of 3.0 V or more, with the potential of metal Li as a reference potential. Another element is preferably an element $M^2$ that is one or a combination of two or more selected from the group consisting of Na, Mg, Al, P, K, Ca, Ti, V, Cr, Fe, Co, Cu, Ga, Y, Zr, Nb, Mo, In, Ta, W, Re, and Ce. The element $M^2$ is a substituent element that mainly contributes to stabilization of the crystal structure and thereby improvement in the characteristics. If the element $M^2$ is selected from among the above-listed elements, it is possible to improve the capacity maintenance rate. The element $M^1$ and the element $M^2$ contained in the structure are different elemental species.

A preferred example of the composition of the core portion A is a composition that contains a spinel-type lithium-manganese-containing complex oxide having a crystal structure in which some of the Mn sites in $LiMn_2O_{4-\delta}$ are replaced by Li, the element $M^1$, and the other element $M^2$. Another example thereof is a spinel-type lithium-manganese-containing complex oxide represented by the formula (1): $Li_x(M^1_yM^2_zMn_{2-x-y-z})O_{4-\delta}$ or the formula (2): general formula $[Li_x(Ni_yM^3_zMn_{3-x-y-z})O_{4-\delta}]$. As described above, the element $M^3$ in the formula (2) is preferably one or a combination of two or more selected from the group consisting of Na, Mg, Al, P, K, Ca, Ti, V, Cr, Fe, Co, Cu, Ga, Y, Zr, Nb, Mo, In, Ta, W, Re, and Ce.

In the formula (1), "x" is preferably from 1.00 to 1.20, "y" is preferably from 0.20 to 1.20, and "z" is preferably from 0.001 to 0.400. Furthermore, in the formula (2), "x" is preferably from 1.00 to 1.20, "y" is preferably from 0.20 to 0.70, and "z" is preferably more than 0 and 0.5 or less. Furthermore, "4-δ" indicates that an oxygen vacancy may be included, and δ is preferably from 0 to 0.2.

Examples of the spinel-type complex oxide include lithium-manganese oxides such as $LiMn_2O_4$, $Li_4Mn_5O_{12}$ ($Li_{1.333}Mn_{1.667}O_4$) and $Li_2Mn_4O_9$ ($Li_{0.889}Mn_{1.778}O_4$), and lithium-manganese-nickel oxides such as $LiNi_xMn_{2-x}O_4$ (x represents a value that is more than 0 and less than 2).

Note that the other aspects regarding the core portion are similar to, for example, those described in WO 2017/150504A1, and thus a description thereof has been omitted.

It is also preferable that the core portion is particles made of a lithium-nickel metal complex oxide containing Li, Mn, and O and having a layered structure (hereinafter, this core portion will also be referred to as a "core portion B"). Furthermore, the core portion preferably contains an element $M^4$ (where $M^4$ is an element that is one or at least two selected from the group consisting of Ni, Co, and Al, or is a combination of an element that is one or at least two selected from the group consisting of Ni, Co, and Al, and one or at least two elements selected from the group consisting of elemental transition metals that are present between the group 3 elements and the group 11 elements on the periodic table and elemental typical metals in periods 1 to 3 on the periodic table) when necessary. The active material of the present invention may also contain another component in addition to the core portion B. However, from the viewpoint of effectively realizing the properties of the core portion B, the core portion B account for preferably 80 mass % or more, more preferably 90 mass % or more, and even more preferably 95 mass % or more (including 100 mass %), of the active material of the present invention.

It is also preferable that the core portion B is particles made of a lithium-metal complex oxide having a layered structure and being represented by the formula (3): $Li_{1+x}M^4_{1-x}O_2$. In the formula (3), "1+x" is preferably from 0.95 to 1.09.

Note that the other aspects regarding the core portion A and the core portion B are similar to, for example, those described in WO 2017/150504A1 or JP 6626434B2, and thus a description thereof has been omitted.

Coating Portion

The coating portion is arranged on the surface of the core portion, and coats the surface of the core portion. The coating portion uniformly coats the surface of the core portion, or partially coats the surface of the core portion such that part of the surface is exposed. In consideration of the coating portion being arranged in order to prevent a deterioration of the performance of the core portion, it is preferable that the coating portion uniformly coats the surface of the core portion and the surface of the core portion is not exposed to the extent possible.

The coating portion is arranged on the surface of the core portion in order to prevent a deterioration of the performance of the core portion during use of a battery containing the active material of the present invention. For this purpose, the core portion contains an element A (A is at least one selected from the group consisting of Ti, Zr, Ta, Nb, and Al) and elemental oxygen (O). The coating portion containing these elements has a function of effectively preventing a deterioration of the performance of the core portion. Of these elements, it is particularly preferable to use Zr because a deterioration of the performance of the core portion is more effectively prevented.

Specifically, when a battery including a positive electrode that contains an active material containing manganese (Mn) is repeatedly charged and discharged, elemental manganese contained in the active material is likely to elute as ions into the electrolyte solution. When Mn ions elute into the electrolyte, Mn may precipitate on the negative electrode, as a result of which the battery performance may deteriorate. Furthermore, if the active material is used in a battery containing a solid electrolyte, when the battery is charged and discharged, a resistance layer may be formed an interface between the active material and the solid electrolyte. If such a resistance layer is formed, transfer of lithium ions is not likely to be smoothly performed, as a result of which the battery performance may deteriorate.

In view of the above-described problems, the inventor of the present invention carefully examined an active material in which the surface of a core portion containing elemental lithium (Li), elemental manganese (Mn), and elemental oxygen (O) is provided with a coating portion containing the element A and elemental oxygen. As a result, it was found that an improvement in the battery performance is limited in the case of using an active material merely provided with a coating portion. A reason for this seems to be that, if the surface of the core portion has a region in which the coating portion is not sufficiently formed, elution of Mn or react with a solid electrolyte cannot be sufficiently suppressed. Furthermore, it was found that, if a coating portion is sufficiently formed on the surface of the core portion, the thickness of the coating portion increases, as a result of which the coating portion causes an increase in the resistance or impedes transfer of lithium ions.

The inventor of the present invention conducted in-depth study based on the above-described facts, and found that it is possible to address the above-described problems by providing an active material in which W/(T×S) is more than 0 and 15% by mass/(cm$^3$/g) or less as described later, wherein T (nm) represents an average thickness of the coating portion, S (m$^2$/g) represents a specific surface area of the active material, and W (% by mass) represents an amount of element A contained in the coating portion.

Specifically, if the active material of the present invention is used in a battery containing an electrolyte solution, elution of manganese contained in the core portion into the electrolyte solution is effectively suppressed through the action of the coating portion. Meanwhile, if the active material of the present invention is used in, for example, a solid-state battery containing a solid electrolyte, a resistance layer is not likely to be formed at an interface between the active material and the solid electrolyte through the action of the coating portion, and thus lithium ions are smoothly inserted into or desorbed from the core portion.

In this manner, when the active material of the present invention is used in either a battery containing a solid electrolyte or a battery containing an electrolyte solution, a deterioration of the performance of the core portion is effectively suppressed through the action of the coating portion. A preferred process for producing a coating portion having such advantages will be described later.

As described above, the coating portion contains an element A that is at least one selected from the group consisting of Ti, Zr, Ta, Nb, and Al. The element A may be composed of one element or two or more elements in combination. Typically, the coating portion may be an oxide of the element A that is composed of one element or two or more elements. If the element A is composed of two or more elements, the coating portion may be a complex oxide of the two or more elements or oxides of the respective elements. If the coating portion is an oxide of the element A, the ratio between the element A and the elemental oxygen in the coating portion is preferably a stoichiometric ratio that allows formation of an oxide of the element A.

The coating portion may also contain elemental lithium (Li) in addition to the element A and the elemental oxygen. If the coating portion contains elemental lithium, the coating portion may be a complex oxide of the elemental lithium and the element A. If the coating portion is a complex oxide of the elemental lithium and the element A, the ratio between the elemental lithium, the element A, and the elemental oxygen in the coating portion is preferably a stoichiometric ratio that allows formation of a complex oxide of the elemental lithium and the element A.

Note that the coating portion may also contain another element in addition to the element A, the elemental oxygen, and the elemental Li.

The coating portion preferably coats the surface of the core portion thinly and closely to the extent possible, from the viewpoint of effectively preventing a deterioration of the performance of the core portion while realizing the original performance of the core portion. The inventor of the present invention conducted an in-depth study from this viewpoint, and found that it is effective that W/(T×S) is more than 0 and 15% by mass/(cm$^3$/g) or less, wherein T (nm) represents an average thickness of the coating portion, S (m$^2$/g) represents a specific surface area of the active material, and W (% by mass) represents an amount of element A contained in the coating portion. W/(T×S) is an indicator that indicates a state of the core portion being coated by the coating portion. Specifically, it means the density of the coating portion per g of the core portion. Conventionally, techniques are known in which the surface of particles of the active material is coated to prevent a deterioration of the performance of the active material, but such conventional techniques cannot sufficiently realize the original performance of the active material due to the coating portion being too thick, and cannot effectively suppress a deterioration of the performance of the active material due to the coating portion not being close. On the other hand, according to the active material of the present invention, the coating portion thinly and closely coats the surface of the core portion, and thus the coating portion can effectively prevent a deterioration of the performance of the core portion without lowering the original performance of the core portion.

From the viewpoint of further increasing the above-described advantageous effects realized by forming the coating portion, W/(S×T) is preferably from 0.1 to 10.0% by mass/(cm$^3$/g), and more preferably from 1.0 to 8.0% by mass/(cm$^3$/g).

The average thickness T (nm) described above is an average of the thicknesses of the coating portions of the respective active material particles. The average thickness T (nm) can be measured, for example, using a scanning transmission electron microscope (STEM). Furthermore, the measurement can be performed in combination with analysis using energy dispersive X-ray spectroscopy (EDS) when necessary. Specifically, the measurement can be performed by performing line analysis on the surface of the active material, and taking the peak width of the element A in the result as the thickness of the coating portion. Note that the line analysis can be performed in a similar way to that of later-described measurement of a half width. Furthermore, the average thickness T (nm) can be obtained as an average through measurement at 10 points on the surface of the active material using the above-described method.

The amount W (% by mass) of the element A described above is an average of the amounts of element A in the respective active material particles. The amount W (% by mass) of the element A can be measured by measuring the amount of element A through ICP optical emission spectroscopy and subtracting the amount of element A in the core portion therefrom.

The specific surface area S (m$^2$/g) described above is obtained through measurement on a powder that is a mass of the active material particles. The specific surface area S (m$^2$/g) is measured using a flow-type gas adsorption specific surface area measurement apparatus, by purging a glass cell for 5 minutes with nitrogen gas flowing at a gas amount of 30 mL/min, performing pre-treatment in a nitrogen gas atmosphere at 250° C. for 10 minutes, and performing measurement using a BET single-point method.

The average thickness T of the coating portion is preferably 50 nm or less because the function of the core portion as an active material is unlikely to be inhibited by the coating portion, and thus the core portion can sufficiently function as an active material. From the viewpoint of further increasing this advantage, the average thickness T of the coating portion is more preferably 40 nm or less, even more preferably 35 nm or less, even more preferably 30 nm or less, and even more preferably 25 nm or less.

On the other hand, the average thickness T of the coating portion is preferably 0.1 nm or more because a deterioration of the performance of the active material can be effectively prevented. From the viewpoint of further increasing this advantage, the average thickness T of the coating portion is more preferably 1.0 nm or more, even more preferably 3.0 nm or more, and even more preferably 5.0 nm or more.

The amount W of element A is preferably from 0.001 to 2.000% by mass because the capacity or the rate characteristics of the core portion are not inhibited. From the viewpoint of further increasing this advantage, the amount W of element A is more preferably from 0.01 to 1.0% by mass, and even more preferably from 0.01 to 0.5% by mass.

The specific surface area S is preferably from 0.1 to 2.0 $m^2/g$ in order to improve the capacity and the rate characteristics of the core portion. From the viewpoint of further increasing this advantage, the specific surface area S is, for example, more preferably 0.2 $m^2/g$ or more, and even more preferably 0.3 $m^2/g$ or more. On the other hand, the specific surface area S is, for example, more preferably 1.5 $m^2/g$ or less, and even more preferably 1.0 $m^2/g$ or less.

As described above, it is preferable that the coating portion of the active material of the present invention coats the surface of the core portion thinly and closely to the extent possible, and such a coating state can be evaluated using a spectrum obtained through line analysis from a surface to an internal portion of the active material using a STEM method at a cross-section of the active material.

Specifically, a half width of a peak of the element A in the spectrum is correlated with the thickness and the closeness of the coating portion, and the half width is preferably 25 nm or less, from the viewpoint of causing the coating portion to effectively prevent a deterioration of the performance of the core portion without lowering the original performance of the core portion. From this viewpoint, the half width is more preferably 20 nm or less, and even more preferably 16 nm or less.

The half width is preferably 0.005 nm or more, more preferably 0.05 nm or more, even more preferably 0.5 nm or more, even more preferably 3.0 nm or more, and even more preferably 5.0 nm or more, from the viewpoint of causing the coating portion to effectively prevent a deterioration of the performance of the core portion.

If the coating portion contains two or more elements A, it is sufficient that the half width of at least one element A is the above-mentioned value or less, but the half widths of all elements A are preferably the above-mentioned value or less.

The half width is measured using the following method.

An average intensity profile of the element A of the coating portion is measured using an energy dispersive X-ray spectroscope (EDS). The measurement conditions using an EDS are as follows.

A powder of the active material is embedded in resin, and a sample in the form of a thin piece that can be subjected to TEM observation is produced using a focused ion beam. A point near the surface of the active material is observed using a scanning transmission electron microscope (STEM) included in the EDS, and mapping data of the element A is acquired using the EDS from a region including the coating portion. An average intensity line profile of the element A that is a component of the coating portion is extracted from the acquired element mapping data. The apparatuses used in this measurement are as follows.

STEM: JEM-ARM200F (manufactured by JEOL Ltd.)
EDS: JED-2300T Dry SD100GV (manufactured by JEOL Ltd.)
EDS analysis software: NSS Ver4.1 (manufactured by Thermo Fisher Scientific K.K.)

Acquiring Conditions of Element Mapping Data

Acceleration voltage: 200 kV, magnification: 2 million times, STEM image acquiring detector: ADF, STEM image acquiring resolution: 512×512 pixels, EDS mapping resolution: 256×256 pixels (the magnification and the measuring time are adjusted as appropriate such that mapping data of the element A of the coating portion can be acquired)

Acquired Content of Average Intensity Profile

A line profile (for 100 points) of the net intensity in which the background is eliminated from a region including the active material and the entire coating layer in the vertical direction (approximately 70 to 90 nm), with a width of approximately 50 nm in the horizontal direction relative to the flat active material surface is extracted for the element A from the acquired element mapping data.

It is sufficient that the coating portion is arranged so as to cover the surface of the core portion. Accordingly, the coating portion may cover the entire surface of the core portion, or may cover part of the surface of the core portion. The coating proportion of the coating portion to the entire surface of the core portion is, for example, preferably 60% or more, more preferably 70% or more, even more preferably 80% or more, and even more preferably 90% or more. The coating proportion of the coating portion can be checked, for example, by observing the surface of the active material using a scanning transmission electron microscope (STEM), in combination with energy dispersive X-ray spectroscopy (EDS) when necessary, as described above, or by using Auger electron spectroscopy.

Active Material

There is no particular limitation on the form of the active material of the present invention, but examples thereof include a particle form. The particle size of the active material of the present invention in the volume cumulative particle size $D_{50}$ (hereinafter, also referred to as an "average particle size") at a cumulative volume of 50 vol % according to a laser diffraction scattering particle size distribution measurement method is, for example, preferably 0.5 μm or more, more preferably 1.0 μm or more, even more preferably 2.0 μm or more, and even more preferably 2.5 μm or more. The reason for this is that excessive aggregation of particles is suppressed, and a satisfactory dispersibility is realized. On the other hand, the volume cumulative particle size $D_{50}$ is, for example, preferably 20.0 μm or less, more preferably 15.0 μm or less, and even more preferably 10.0 μm or less. The reason for this is that contact between the active material particles and contact between the active material particles and the solid electrolyte particles can be sufficiently ensured.

Herein, the volume cumulative particle size $D_{50}$ has a meaning of an alternative value for the mean diameter of particles including primary particles and secondary particles. The term "primary particles" means the smallest unit particle defined by grain boundaries when observed under an SEM (scanning electron microscope; e.g., at 500 to 5000 times). The active material of the present invention means the primary particles unless otherwise described. Meanwhile, as used in the present invention, the term "secondary particles" means a particle that is formed by a plurality of primary particles aggregating so as to share portions of their outer peripheries (grain boundaries) and that is independent from other particles.

The volume cumulative particle size $D_{50}$ is measured as follows. A powder of the active material is added to solvent in which 0.1% by mass of hexametaphosphoric acid is mixed with 20% by mass of ethanol solvent using an automatic sample feeder ("Microtrac SDC" manufactured by MicrotracBEL Corporation) for a laser diffraction particle size distribution measuring apparatus, and then ultrasonic irradiation at 40 W for 90 seconds is performed at a flow rate of 40%, after which the particle size distribution is measured using a laser diffraction particle size distribution measuring apparatus "MT3000 II" manufactured by MicrotracBEL Corporation, and the volume cumulative particle size $D_{50}$ is measured from the obtained chart of the volume-weighted particle size distribution.

Note that, during the measurement of $D_{50}$, the water-soluble solvent passed through a 60-μm filter is used, the "Solvent Refractive Index" is 1.33, the particle transparency condition is "Transparent", the measuring range is from 0.243 to 704.0 μm, the measuring time is 30 seconds, and an average of values in two times of measurement is taken as $D_{50}$.

From the viewpoint of reducing the interface resistance between the active material and the solid electrolyte, it is advantageous that the moisture content of the active material of the present invention is adjusted to a constant range. Specifically, if the moisture content of the active material is excessively high, the interface resistance between the active material and the solid electrolyte may increase.

The moisture content (mass ppm) of the active material of the present invention up to 300° C. as measured using the Karl-Fischer method may be, for example, 600 ppm or less, 550 ppm or less, or 500 ppm or less. Furthermore, the moisture content may be 10 ppm or more, 50 ppm or more, 100 ppm or more, or 200 ppm or more. The smaller the amount of moisture contained in the active material, the better, from the viewpoint of suppressing a deterioration of the structure of the active material due to a reaction with lithium and reducing a reaction with the electrolyte during an operation of the battery. In order to reduce the amount of moisture contained in the active material to the extent possible, for example, it is sufficient to dry the active material at a temperature of 300° C., etc., in a vacuum, or in an inert atmosphere.

The moisture content is measured using the Karl-Fischer method following the procedure below. That is to say, using a Karl-Fischer moisture meter, the released moisture content (mass ppm) of a measurement sample heated at 110° C. is measured, and then the released moisture content (mass ppm) of the measurement sample heated at 300° C. is measured, and a value obtained by adding the measured values is taken as the moisture content. The measurement is performed in a nitrogen atmosphere, for example, using a CA-100 (manufactured by Mitsubishi Chemical Corporation) as the measuring apparatus.

Process for Producing Active Material

Next, a preferred process for producing the active material of the present invention will be described. In this producing process, a core portion is formed using a common process, and then a coating portion is formed through atomic layer deposition (hereinafter, also be referred to as "ALD").

There is no particular limitation on the process for producing the core portion, and it is sufficient to produce a complex oxide containing elemental lithium (Li), elemental manganese (Mn), and elemental oxygen (O) using a conventionally known process. For example, a lithium carbonate powder and a manganese oxide powder (e.g., manganese dioxide powder) are used as raw materials, these materials are mixed to obtain a powder mixture, and the powder mixture is fired to obtain a complex oxide. When the particle size of the thus obtained complex oxide is adjusted to a desired particle size through pulverization, the core portion is obtained.

A coating portion is formed through ALD on the surface of the thus obtained core portion. According to ALD, it is theoretically possible to form the coating portion, atomic layer by atomic layer, and thus a thin and close coating portion can be formed. As another process for forming a coating portion, for example, a sol-gel method is conceivable, but it is not easy to form a thin and close coating portion using the sol-gel method.

In the case of forming a coating portion containing aluminum and oxygen, for example, the coating portion can be formed as follows. First, a coating portion can be formed through a process including: a first step of placing the core portion in a reaction chamber; a second step of removing moisture attached to the core portion by heating the reaction chamber; a third step of heating the internal portion of the reaction chamber to a film forming temperature and adding a precursor substance of the coating portion; a fourth step of adding an oxidant into the chamber; a fifth step of removing the excessive precursor substance and a reaction product in a gaseous phase; and a sixth step of adding an oxidant into the chamber.

In the first step, it is preferable to form a fluidized bed by introducing inert gas into the reaction chamber. Examples of the inert gas include nitrogen and argon. The flow rate of inert gas ($N_2$, Ar) can be set, for example, within the range of 10 $cm^3$/min to 100 L/min.

The heating temperature in the second step can be set, for example, within the range of 100 to 200° C. Furthermore, the heating time at that time can be set, for example, within the range of 1 to 12 hours.

There is no particular limitation on the heating temperature in the third step, as long as it is a temperature that allows formation of the coating portion, and can be set, for example, within the range of 50 to 400° C. Examples of the precursor substance include organic aluminum compounds such as trimethyl aluminum (hereinafter, also referred to as "TMA"). Furthermore, in the third step, it is also possible to add a heated precursor substance into the reaction chamber. The heating temperature of the precursor substance can be set, for example, within the range of room temperature to 300° C. Note that the third step is preferably performed until the precursor substance is chemically adsorbed onto the surface of the core portion and forms a single layer thereon.

Examples of the oxidant that may be used in the fourth step include $H_2O$, $O_3$, $H_2O_2$, $H_2$ plasma, $O_2$ plasma, Ar plasma, and $N_2O$ plasma.

In the fifth step, for example, it is possible to remove the excessive precursor substance and a reaction product through purging. Examples of the reaction product include methane gas.

In the sixth step, the core portion is exposed to the oxidant and reacts with a single layer of the precursor substance, and a target coating portion can be formed through this reaction. The oxidant may be the same as the oxidant used in the fourth step.

If the first to sixth steps are repeated until a target film thickness is obtained, a thin and close coating portion can be smoothly formed.

The first to sixth steps are preferably repeated until the amount of element A contained in the coating portion reaches, for example, the range of 10 to 50,000 ppm.

If the element A is Zr, examples of the precursor that may be used in the present invention include $Zr(NEtMe)_4$, $ZrI_4$, $ZrCp_2Me_2$, $ZrCp_2Me_2$, $ZrCp_2Me(OMe)$, $ZrCp_2Cl_2$, $ZrCp(NMe_2)_3$, $ZrCl_4$, $Zr[N(SiMe_3)_2]_2Cl_2$, $Zr(thd)_4$, $Zr(NEt_2)_4$, $Zr(O^tBu)_4$, $Zr(O^tBu)_2(dmae)_2$, $Zr(O^iPr)_4$, $Zr(O^iPr)_2(dmae)_2$, $Zr(NEtMe)_4$, $Zr(NEtMe)_3$(guan-NEtMe), $Zr(NEtMe)_2$(guan-NEtMe)$_2$, $Zr(MeCp)(TMEA)$, ZrTDMA, $Zr(MeAMD)_4$, $Zr(dmae)_4$, $Zr(CpMe_2)_2Me(O^tBu)$, Zr(Cp-Me)CHT, $Zr(CpMe)_2Me_2$, $Zr(Cp_2CMe_2)Me(OMe)$, and $Zr(Cp)(^tBuDAD)(O^iPr)$.

Furthermore, for example, if the element A is Al, examples of the precursor include $AlMe_3$, $AlMe2O^iPr$, AlMe$_2$H, AlMe$_2$Cl, AlMe2(C$_3$H$_6$NMe$_2$), AlH$_3$N:(C$_5$H$_{11}$), AlEt$_3$, AlCl$_3$, AlBu$_3$, Al$_2$(NMe$_2$)$_6$, Al(O$^s$Bu)$_3$, Al(O$^n$Pr)$_3$, Al(OEt)$_3$, Al(NMe$_2$)$_3$, Al(N$^i$Pr$_2$)$_3$, Al(N$^i$Pr$_2$)$_2$(C$_3$H$_6$NMe$_2$), Al(NEt$_2$)$_3$, Al(NEt$_2$)$_2$(C$_3$H$_6$NMe$_2$), Al(mmp)$_3$, Al($^i$PrAMD)Et$_2$, and Al(CH$_3$)$_3$.

Furthermore, for example, if the element A is Ti, examples of the precursor include Tb(thd)$_3$, Ti(Cp)CHT, Ti(CpMe)(O$^i$Pr)$_3$, Ti(CpMe$_5$)(OMe)$_3$, Ti(EtCp)(NMe$_2$)$_3$, Ti(NEt$_2$)$_4$, Ti(NEtMe)$_3$(guan-NEtMe), Ti(NEtMe)$_4$, Ti(NMe$_2$)$_3$(CpMe), Ti(NMe$_2$)$_3$(CpN), Ti(NMe$_2$)$_3$(dmap), Ti(NMe$_2$)$_4$, Ti(NMeEt)$_4$, Ti(Np)$_4$, Ti(OEt)$_4$, Ti(O$^i$Pr)$_2$(dmae)$_2$, Ti(O$^i$Pr)$_2$(NMe$_2$)$_2$, Ti(O$^i$Pr)$_2$(thd)$_2$, Ti(O$^i$Pr)$_3$($^i$Pr$_2$AMD), Ti(O$^i$Pr)$_4$, Ti(OMe)$_4$, Ti(O$^t$Bu)$_4$, TiCl$_4$, TiCp2(($^i$PrN)$_2$C(NH$^i$Pr)), TiF$_4$, and TiI$_4$.

Furthermore, for example, if the element A is Ta, examples of the precursor include Ta(NEt)(NEt$_2$)$_3$, Ta(NEt$_2$)$_3$ N$^t$Bu, Ta(NEt$_2$)$_5$, Ta(NEtMe)$_2$(N$^i$Pr), Ta(NEtMe)$_5$, Ta(N$^i$Pr)(NEtMe)$_2$, Ta(NMe$_2$)$_3$(CMe$_2$Et), Ta(NMe$_2$)$_5$, Ta(N$^t$Am)(NMe$_2$)$_3$, Ta(N$^t$Am)[(NMe$_2$)]$_3$, Ta(N$^t$Bu)($^i$PrAMD)$_2$(NMe$_2$), Ta(N$^t$Bu)(NEt$_2$)$_3$, Ta(N$^t$Bu)($^t$Bu$_2$pz)$_3$, Ta(OEt)$_4$(dmae), Ta(OEt)$_5$, TaBr$_5$, TaCl$_5$, TaCp(N$^t$Bu)(NEt$_2$)$_2$, TaF$_5$, and TaNp$_3$Cl$_2$.

Furthermore, for example, if the element A is Nb, examples of the precursor include Nb(N$^t$Bu)(NEt$_2$)$_3$, Nb(N$^t$-Bu)(NEtMe)$_3$, Nb(OEt)$_5$, NbCl$_5$, and NbF$_5$.

If the coating portion contains elemental lithium in addition to the element A and elemental oxygen, a precursor substance containing Li may be used in the above-described ALD, and examples of the precursor containing Li include LiO$^t$Bu, LiOSiMe$_3$, LiN(SiMe$_3$)$_2$, Li(thd), and Li(N(SiMe$_3$)$_2$).

Electrode Mixture

The thus obtained active material of the present invention may be used, for example, in the form of an electrode mixture containing the active material and an electrolyte. The electrolyte may be either a solid or a liquid. If a solid electrolyte is used as the electrolyte, the content of the active material in the electrode mixture may be 30% by mass or more, 40% by mass or more, or 50% by mass or more, when the total solid content is taken as 100% by mass. Furthermore, the content of the active material may be, for example, 98% by mass or less, 90% by mass or less, or 85% by mass or less. If the content of the active material is within the above-mentioned range, the function of the electrode can be sufficiently realized.

The solid electrolyte that may be used in the present invention may be the same as a solid electrolyte used in ordinary solid-state batteries. Examples thereof include sulfide solid electrolytes, oxide solid electrolytes, nitride solid electrolytes, and halide solid electrolytes. Of these solid electrolytes, a sulfide solid electrolyte is preferable. The sulfide solid electrolyte may be, for example, a sulfide solid electrolyte containing elemental lithium (Li) and elemental sulfur (S) and having lithium ion conductivity, or a sulfide solid electrolyte containing elemental lithium (Li), elemental phosphorus (P), and elemental sulfur (S) and having lithium ion conductivity. The sulfide solid electrolyte may be any of crystalline material, glass ceramic, and glass. The sulfide solid electrolyte may have a crystal phase with an argyrodite-type structure. Examples of this kind of sulfide solid electrolyte include compounds represented by Li$_2$S—P$_2$S$_5$, Li$_2$S—P$_2$S$_5$—LiX ("X" is one or more elemental halogens), Li$_2$S—P$_2$S$_5$—P$_2$O$_5$, Li$_2$S—Li$_3$PO$_4$—P$_2$S$_5$, Li$_3$PS$_4$, Li$_4$P$_2$S$_6$, Li$_{10}$GeP$_2$S$_{12}$, Li$_{3.25}$Ge$_{0.25}$P$_{0.75}$S$_4$, Li$_7$P$_3$S$_{11}$, Li$_{3.25}$P$_{0.95}$S$_4$, and LiaPSbXc (X is at least one elemental halogen, a is a value of 3.0 to 6.0, b is a value of 3.5 to 4.8, and c is a value of 0.1 to 3.0). Other examples thereof include sulfide solid electrolytes described in WO 2013/099834A1 and WO 2015/001818A1.

The electrolyte solution that may be used in the present invention may be the same as an electrolyte solution used in ordinary liquid-state batteries. Examples thereof include organic electrolyte solutions, high molecular solid electrolytes, and molten salts. Examples of solvent in the organic electrolyte solutions include: esters such as propylene carbonate, ethylene carbonate (hereinafter, EC), butylene carbonate, diethyl carbonate, dimethyl carbonate, methyl ethyl carbonate, and γ-butyrolactone (hereinafter, GBL); ethers such as tetrahydrofuran, substituted tetrahydrofurans (e.g., 2-methyl tetrahydrofuran), dioxolane, diethyl ether, dimethoxyethane, diethoxy ethane, and methoxyethoxy ethane; dimethyl sulfoxide, sulfolane, methyl sulfolane, acetonitrile, methyl formate, and methyl acetate, which may be used alone or in a combination of two or more. Furthermore, examples of an electrolyte salt that is dissolved in the organic solvent include lithium salts such as lithium perchlorate, lithium fluoroborate, lithium hexafluorophosphate (hereinafter, referred to as "LiPF$_6$"), lithium hexafluoroarsenate, lithium trifluoromethanesulfonate, lithium halide, and lithium chloride aluminate.

The active material contained in the electrode mixture may be the active material of the present invention alone, or a combination of the active material of the present invention and another active material. Examples of the other active material include particles made of known lithium-transition metal complex oxides. If the active material of the present invention is used in combination with the other active material, the active material of the present invention is contained in an amount of preferably 50% by mass or more, and more preferably 70% by mass or more, with respect to the entire active material.

If the electrode mixture contains a solid electrolyte, the electrode mixture may also contain other materials such as a conductivity aid or a binder when necessary. An electrode layer such as a positive electrode layer can be formed using a method in which the electrode mixture and solvent are mixed to prepare paste, and the paste is applied to and dried on a current collector such as aluminum foil. Furthermore, in the case of a battery obtained not through such application but through powder compaction, an electrode layer can be formed using a method in which materials of the active material, the solid electrolyte, and a conductivity aid are subjected to solid phase mixing, and the mixture is molded into pellets.

Battery

The active material of the present invention can be preferably used as a positive electrode active material of a battery. The battery may be either a primary battery or a secondary battery. The battery of the present invention may include, for example, a positive electrode layer, a negative electrode layer, and an electrolyte layer arranged between the positive electrode layer and the negative electrode layer and containing an electrolyte solution. The positive electrode layer contains the active material of the present invention.

The active material of the present invention can be preferably used in a solid-state battery, in particular, a solid-state lithium battery. Of these butteries, it can be preferably used in a secondary battery, in particular, a solid-state lithium secondary battery. The battery may have a shape such as laminate shape, a cylinder shape, a square shape, or a coin shape.

It is preferable that the solid-state battery includes a positive electrode layer, a negative electrode layer, and a solid electrolyte layer arranged between the positive electrode layer and the negative electrode layer, and the positive electrode layer contains the above-described active material of the present invention. The solid-state battery can be formed, for example, by compression-molding the positive electrode layer, the solid electrolyte layer, and the negative electrode layer stacked in this order. The term "solid-state battery" encompasses, in addition to a solid-state battery that does not contain any liquid substance or gel substance as the electrolyte, a battery that contains a liquid substance or a gel substance as the electrolyte in an amount of, for example, 50 mass % or less, 30 mass % or less, or 10 mass % or less.

The negative electrode active material used in the negative electrode layer may be the same as a negative electrode active material used in ordinary solid-state batteries. Specific examples of the negative electrode active material include known materials such as materials that absorb and release lithium ions, for example, carbon materials, silicon and silicon oxide-based compounds such as Si—O, tin-based compounds, and lithium titanate. Examples of the carbon materials include: those obtained by sintering organic high molecular compounds such as polyacrylonitrile, a phenol resin, a phenol novolac resin, and cellulose; as well as artificial graphite and natural graphite. The negative electrode layer can be produced in a similar manner to that of the positive electrode layer, except that such a negative electrode active material is used.

EXAMPLES

Hereinafter, the present invention will be described in greater detail by means of examples. However, the scope of the present invention is not limited to the examples below.

Example 1

(1) Preparation of Core Portion

A spinel-type lithium-manganese-nickel-containing complex oxide (hereinafter, also referred to as an "LMNO") was prepared as a core portion. As a result of chemical analysis, the LMNO contained 4.1% by mass of Li, 41.7% by mass of Mn, 13.3% by mass of Ni, and 5.3% by mass of Ti.

(2) Formation of Coating Portion

A coating portion containing an element A and elemental oxygen was formed through ALD on the surface of the core portion. Tris(dimethylamino)cyclopentadienyl zirconium ($ZrCp(NMe_2)_3$) was used as a precursor substance containing the element A. A fluidized bed was formed in a reaction chamber using nitrogen as inert gas at a flow rate of 50 $cm^3$/min. Next, the precursor substance was introduced into the reaction chamber in which the temperature was set to the film forming temperature 350° C., thereby forming a film using water as an oxidant and setting the Zr amount to 150 ppm. In this manner, a target active material was obtained.

Examples 2 and 3

Active materials were obtained in a similar way to that of Example 1, except that the Zr amount in Example 1 was changed to 600 ppm (Example 2) and 900 ppm (Example 3) respectively.

Example 4

An active material was obtained in a similar way to that of Example 1, except that the precursor substance in Example 1 was changed to tetrakis(dimethylamino)zirconium (ZrTDMA) and the Zr amount was changed to 1500 ppm.

Comparative Example 1

The coating portion in Example 1 was not formed. An active material was obtained in a similar way to that of Example 1, except for that aspect.
Evaluation The average thickness T of the coating portion, the specific surface area S of the active material, and the amount W of element A, of each of the active materials obtained in the examples and comparative example, were measured using the above-described methods. Furthermore, the half width of a spectrum obtained through line analysis using the STEM method was measured. Furthermore, the particle size $D_{50}$ and the moisture content were measured using the above-described methods. Furthermore, the rate characteristics and the cycle characteristics of each of batteries containing the active materials were measured using later-described methods. Table 1 below shows the results.
Assembly of Battery First, 8.0 g of a powder of each of the active materials obtained in the examples and comparative example and 1.0 g of acetylene black (manufactured by Denka Company Limited) were weighed and mixed in a mortar for 10 minutes. Subsequently, the mixture of the powder of the active material and the acetylene black was added to and mixed with 8.3 g of solution obtained by dissolving 12% by mass of PVdF (manufactured by Kishida Chemical Co., Ltd.) in N-methylpyrrolidone (NMP). Subsequently, 5 mL of NMP was added to and sufficiently mixed with the mixture to prepare paste. This paste was applied to aluminum foil serving as a current collector. The paste was applied using an applicator adjusted to a gap of 100 to 280 μm. The film formed through application of the paste was dried at 140° C. in a vacuum for one whole day and night. Subsequently, roll pressing was performed at a line pressure of 0.3 t/$cm^2$. The aluminum foil was punched into a circular piece with a diameter of 16 mm, and this piece was used as a positive electrode.

Immediately before producing a battery, the positive electrode was dried in a vacuum at 200° C. for 300 minutes or more to remove attached moisture, after which the positive electrode was assembled into the battery. Furthermore, an average mass of aluminum foil with a diameter of 16 mm was obtained in advance, and the mass of the positive electrode mixture was obtained by subtracting the mass of the aluminum foil from the mass of the positive electrode. Furthermore, the content of the active material was obtained from the mixing proportion between the active material, the acetylene black, and the PVdF.

Metal Li foil with a diameter of 19 mm and a thickness of 0.5 mm was used as a negative electrode. An electrolyte solution was obtained by dissolving 1 mol/L of $LiPF_6$ as solute in solvent in which ethylene carbonate and dimethyl carbonate were mixed in a ratio in volume of 3:7.

A cell for electrochemical evaluation was produced using the above-described positive electrode, negative electrode, and electrolyte solution.
Initial Activity The initial activity of the produced battery was performed using the method described below. After constant-current and constant-potential charge at 0.1 C was performed at 25° C. to 4.999 V, constant-current discharge at 0.1 C was performed to 3.0 V. This cycle was repeated three times.

Note that the actually set current value was calculated from the content of the positive electrode active material in the positive electrode.

Rate Characteristics

The battery after the above-described initial activity was subjected to constant-current and constant-potential charge at 0.1 C at 25° C. to 4.999 V. After the charge, constant-current discharge at 1 C was performed to 3 V. A value obtained by dividing the discharge capacity during constant-current discharge at 5 C to 3 V by the discharge capacity during discharge at 0.1 C to 3 V was taken as an indicator of the rate characteristics.

Cycle Characteristics

Separately from the operation above, the cycle in which the battery after the initial activity was subjected to constant-current and constant-potential charge at 0.1 C and then constant-current discharge at 0.1 C was performed once, and then the cycle in which the battery was charged and discharged at 0.5 C was performed 50 times, at 25° C. within a charge and discharge range of 3.0 to 4.999 V.

A percentage (%) of a value obtained by dividing the discharge capacity in the 50-th cycle by the discharge capacity in the second cycle was taken as a value indicating the cycle characteristics.

TABLE 1

| | Coating portion | | | Active material | | | Battery | |
|---|---|---|---|---|---|---|---|---|
| | Average thickness T [nm] | Amount W of element A [wt %] | W/(ST) [wt %/(cm$^3$/g)] | Line analysis Half width [nm] | Specific surface area S [m$^2$/g] | Average particle size $D_{50}$ [μm] | Moisture content [ppm] | Rate characteristics (1.0 C/0.1 C) [%] | Cycle characteristics [%] |
| Ex. 1 | 11 | 0.014 | 1.6 | 6 | 0.8 | 5 | 84 | 89 | 97 |
| Ex. 2 | 17 | 0.057 | 3.9 | 7 | 0.9 | 4 | 216 | 89 | 96 |
| Ex. 3 | 25 | 0.091 | 3.5 | 12 | 1.0 | 4 | 365 | 92 | 95 |
| Ex. 4 | 24 | 0.152 | 7.6 | 12 | 0.8 | 5 | 580 | 89 | 98 |
| Com. Ex. 1 | — | — | — | — | 0.9 | 4 | 315 | 86 | 92 |

As is clearly seen from the results shown in Table 1, the active materials obtained in the examples have better rate characteristics than those of the active material obtained in the comparative example. The reason for this seems to be that the interface resistances at the surfaces of the active materials obtained in the examples are low.

Furthermore, it is seen that the active materials obtained in the examples have better cycle characteristics than those of the active material obtained in the comparative example. The reason for this seems to be that elution of manganese during charge and discharge of the batteries containing the active materials obtained in the examples is suppressed.

INDUSTRIAL APPLICABILITY

According to the present invention, an active material capable of realizing excellent battery performance and a process for producing the same are provided.

The invention claimed is:

1. An active material comprising:
   a core portion; and
   a coating portion arranged on a surface of the core portion,
   wherein the core portion includes a complex oxide having a spinel-type structure, and the core portion contains elemental lithium (Li), elemental manganese (Mn), elemental nickel (Ni), elemental titanium (Ti), and elemental oxygen (O),
   the coating portion contains an element A and elemental oxygen (O), wherein the element A is at least one selected from the group consisting of Ti, Zr, Ta, Nb, and Al,
   W/(S×T) is 0.1% by mass/(cm$^3$/g) or more and 15% by mass/(cm$^3$/g) or less, wherein T (nm) represents an average thickness of the coating portion, S (m$^2$/g) represents a specific surface area of the active material, and W (% by mass) represents an amount of the element A contained in the coating portion,
   the average thickness T of the coating portion is 0.1 nm or more and 25 nm or less,
   the amount W of the element A is from 0.01 to 0.5% by mass,
   the specific surface area S is from 0.3 to 1.5 m$^2$/g, and
   a half width of a peak of the element A in a spectrum is 25 nm or less, and the spectrum is obtained through line analysis from a surface to an internal portion of the active material using a STEM method at a cross section of the active material.

2. The active material according to claim 1, wherein the coating portion further contains elemental lithium (Li).

3. The active material according to claim 1, having a moisture content of 600 ppm or less.

4. The active material according to claim 1, having an average particle size of from 0.5 to 20 μm.

5. The active material according to claim 1, wherein a coating ratio of the coating portion with respect to the surface of the core portion is equal to or more than 60%.

6. The active material according to claim 5, wherein the coating portion covers an entirety of the surface of the core portion.

7. The active material according to claim 1, wherein the active material is configured with a plurality of particles,
   a volume cumulative particle size $D_{50}$ of the active material is in a range of 0.5 μm to 10.0 μm, and
   the volume cumulative particle size $D_{50}$ corresponds to a size at a cumulative volume 50 vol % according to a laser diffraction scattering particle size distribution measurement method with respect to the plurality of particles.

8. An electrode mixture comprising the active material according to claim 1 and an electrolyte solution.

9. An electrode mixture comprising the active material according to claim 1 and a solid electrolyte.

10. The electrode mixture according to claim 9, wherein a content of the active material is from 30 to 98% by mass when a total solid content is 100% by mass.

11. A battery comprising:
a positive electrode layer;
a negative electrode layer; and
an electrolyte layer arranged between the positive electrode layer and the negative electrode layer and containing an electrolyte solution,
wherein the positive electrode layer contains the active material according to claim 1.

12. A battery comprising:
a positive electrode layer;
a negative electrode layer; and
an electrolyte layer arranged between the positive electrode layer and the negative electrode layer and containing a solid electrolyte,
wherein the positive electrode layer contains the active material according to claim 1.

13. A process for producing the active material according to claim 1, comprising:
forming the coating portion containing the element A and the elemental oxygen (O) through atomic layer deposition on the surface of the core portion which contains elemental lithium (Li), elemental manganese (Mn), elemental nickel (Ni), elemental titanium (Ti), and elemental oxygen (O).

\* \* \* \* \*